US012202304B2

(12) United States Patent
Fukuzaki et al.

(10) Patent No.: US 12,202,304 B2
(45) Date of Patent: Jan. 21, 2025

(54) TIRE

(71) Applicant: BRIDGESTONE CORPORATION, Tokyo (JP)

(72) Inventors: Sho Fukuzaki, Tokyo (JP); Toshio Hosoda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 319 days.

(21) Appl. No.: 17/414,020

(22) PCT Filed: Dec. 17, 2019

(86) PCT No.: PCT/JP2019/049378
§ 371 (c)(1),
(2) Date: Jun. 15, 2021

(87) PCT Pub. No.: WO2020/129971
PCT Pub. Date: Jun. 25, 2020

(65) Prior Publication Data
US 2022/0024254 A1    Jan. 27, 2022

(30) Foreign Application Priority Data
Dec. 17, 2018    (JP) .................................. 2018-235261

(51) Int. Cl.
*B60C 9/18*    (2006.01)
*B60C 9/20*    (2006.01)
*B60C 9/22*    (2006.01)

(52) U.S. Cl.
CPC ........ *B60C 9/22* (2013.01); *B60C 2009/2257* (2013.01); *B60C 2009/2266* (2013.01); *B60C 2009/228* (2013.01)

(58) Field of Classification Search
CPC .... B60C 9/20; B60C 9/22; B60C 9/18; B60C 2009/228; B60C 2009/2093
See application file for complete search history.

(56) References Cited

U.S. PATENT DOCUMENTS

2006/0225824 A1* 10/2006 Kuwajima ................ B60C 9/22
152/531
2006/0225826 A1    10/2006 Kotanides, Jr.
(Continued)

FOREIGN PATENT DOCUMENTS

CN    1836922 A    9/2006
CN    1840366 A    10/2006
(Continued)

OTHER PUBLICATIONS

Chinese Search Report dated Jul. 25, 2022 from the Chinese Patent Office in Chinese Application No. 201980083325.1.
(Continued)

Primary Examiner — Cedrick S Williams
(74) Attorney, Agent, or Firm — Sughrue Mion, PLLC

(57) ABSTRACT

On a tread of the pneumatic tire, circumferential grooves extending along the tire circumferential direction are formed. The spiral belt has a reinforcing cord wound in the tire circumferential direction. The tensile elongation at break of the reinforcing cord is 10 cN/dtex or more, and the elongation at break of the reinforcing cord is 13% or less. The spiral belt is formed by winding a cord unit, in which a plurality of reinforcing cords are arranged along the tire width direction, around the tire circumferential direction. The width of the cord unit in the tire width direction is narrower than the width GW of the circumferential groove in the tire width direction.

16 Claims, 3 Drawing Sheets

(56) References Cited

U.S. PATENT DOCUMENTS

| | | |
|---|---|---|
| 2010/0300595 A1 | 12/2010 | Imhoff et al. |
| 2012/0125508 A1 | 5/2012 | Ichihara |
| 2012/0241068 A1 | 9/2012 | Ichihara |
| 2015/0165827 A1* | 6/2015 | Kawakami .......... B60C 11/1369 152/209.22 |
| 2016/0059631 A1 | 3/2016 | Okazaki |
| 2017/0274706 A1 | 9/2017 | Reese et al. |
| 2018/0093532 A1 | 4/2018 | Bestgen et al. |
| 2018/0187344 A1* | 7/2018 | Fidan ...................... D02G 3/48 |
| 2019/0152260 A1 | 5/2019 | Kouno et al. |
| 2021/0115599 A1* | 4/2021 | Nayuki .................... D02G 3/48 |

FOREIGN PATENT DOCUMENTS

| | | |
|---|---|---|
| CN | 101898488 A | 12/2010 |
| CN | 102548775 A | 7/2012 |
| CN | 102656025 A | 9/2012 |
| CN | 105263726 A | 1/2016 |
| CN | 108688408 A | 10/2018 |
| EP | 1 209 009 A2 | 5/2002 |
| JP | 2003-182307 A | 7/2003 |
| JP | 2006-240471 A | 9/2006 |
| JP | 2008-195148 A | 8/2008 |
| JP | 2016-147655 A | 8/2016 |
| JP | 2017-521574 A | 8/2017 |
| JP | 2018-108753 A | 7/2018 |
| JP | 2018-164967 A | 10/2018 |
| JP | 2018-192902 A | 12/2018 |
| WO | 2015/045728 A1 | 4/2015 |
| WO | 2017/200063 A1 | 11/2017 |

OTHER PUBLICATIONS

Extended European Search Report dated Aug. 1, 2022 in European Application No. 19901329.3.
"Polymer Material", 2009, pp. 94-95 (7 pages total).
"Tribology and Lubrication Technology", 2013, p. 52 (4 pages total).
International Search Report for PCT/JP2019/049378, dated Mar. 24, 2020.
Communication dated Mar. 22, 2022 from the Japanese Patent Office in Japanese Application No. 2018-235261.
"Kevlar Properties", DuPont, 2018, https://web.archive.org/web/20230804021215/https://www.td-net.co.jp/kevlar/data/ (4 pages).

* cited by examiner

TIRE

CROSS REFERENCE TO RELATED APPLICATIONS

This application is a National Stage of International Application No. PCT/JP2019/049378 filed Dec. 17, 2019, claiming priority based on Japanese Patent Application No. 2018-235261 filed Dec. 17, 2018.

TECHNICAL FIELD

The present invention relates to tire, and more particularly to tire, which can be suitably used for high-performance four-wheel vehicles.

BACKGROUND ART

Conventionally, in the pneumatic tire (hereinafter abbreviated as tire) for four-wheel vehicles such as passenger vehicles, and particularly in the tire for high-performance four-wheel vehicles (including vehicles for racing), a structure having a reinforcing belt (also called a spiral belt), in which a reinforcing cord is wound along the tire circumferential direction, is disposed on the outside of the tire radial direction of a pair of crossing belts is widely used (see Patent Literature 1.).

Thus, in particular, the diameter growth in which the tire expands in the tire radial direction during high-speed traveling is effectively suppressed, and high-speed durability can be enhanced.

CITATION LIST

Patent Literature

[PTL 1] Japanese Unexamined Patent Application Publication No. 2006-240471

SUMMARY OF INVENTION

According to the tire described above, the diameter growth of the tire during high-speed traveling can be suppressed. On the other hand, particularly in the case of a high-performance four-wheel vehicle, there is a demand for further improving a cornering force (CF) at a low slip angle (SA) in such a tire.

Thus, in particular, the cornering force of the rear tire to which the steering angle is not given can be effectively increased, and the lap time of the racecourse can be improved.

Accordingly, an object of the present invention is to provide a tire in which the cornering force generated at a low slip angle is further enhanced while improving high-speed durability.

One aspect of the present invention is a tire (pneumatic tire 10) comprising at least a tread (tread 20) in contact with a road surface, and a reinforcing belt (spiral belt 100) disposed inside in a tire radial direction of the tread. A circumferential groove (circumferential groove 25) extending along the tire circumferential direction is formed on the tread, the reinforcing belt has a reinforcing cord (spiral cord 111) wound around a tire circumferential direction, the tensile elongation at break of the reinforcing cord is 10 cN/dtex or more, the reinforcing cord has an elongation at break of 13% or less, the reinforcing belt is formed by a cord unit (cord unit 110) in which a plurality of the reinforcing cords are arranged along the tire width direction and are wound around the tire circumferential direction, and the width (unit width W) of the cord unit in the tire width direction is narrower than the width (width GW) of the circumferential groove in the tire width direction.

DESCRIPTION OF EMBODIMENTS

Figure 1:
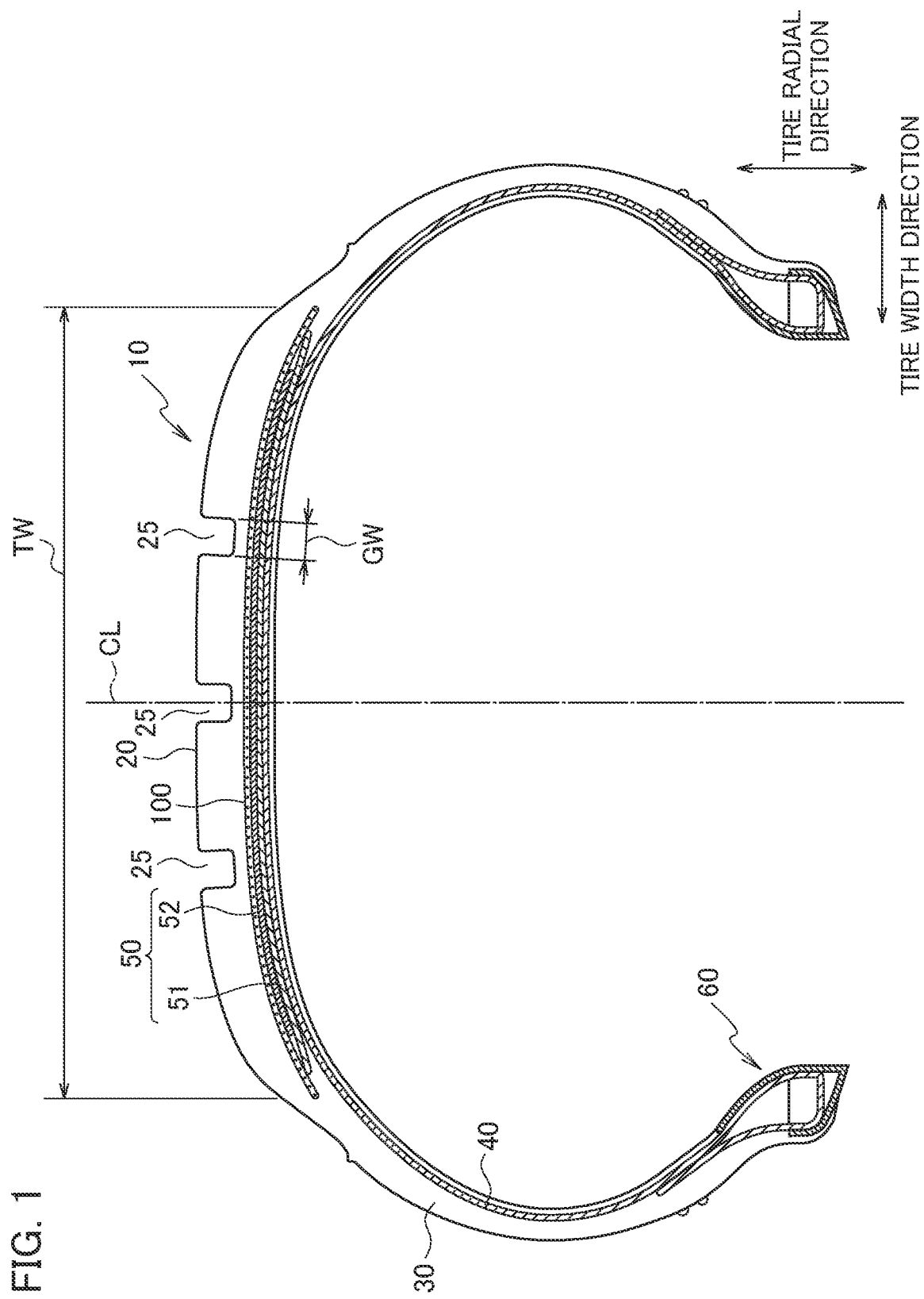
FIG. 1 is a cross-sectional view of a pneumatic tire 10.

Embodiments will be described below with reference to the drawings. The same functions and configurations are denoted by the same or similar reference numerals, and description thereof will be omitted as appropriate.

Embodiments will be described below with reference to the drawings. The same functions and configurations are denoted by the same or similar reference numerals, and description thereof will be omitted as appropriate.

(1) OVERALL STRUCTURE OF TIRE

FIG. 1 is a sectional view of the pneumatic tire 10 according to the present embodiment. Specifically, FIG. 1 is a cross-sectional view of pneumatic tire 10 taken along tire width direction and tire radial direction. In FIG. 1, the sectional hatching is partially omitted (hereinafter the same). A tire equatorial line CL represents the center of the pneumatic tire 10 in tire width direction and tire circumferential direction.

As shown in FIG. 1, the pneumatic tire 10 includes a tread 20, a tire side portion 30, the carcass 40, a crossing belt layer 50, a bead portion 60 and the spiral belt 100.

The pneumatic tire 10 is a pneumatic tire for a four-wheel vehicle such as a passenger vehicle and can be suitably used especially for a high-performance four-wheel vehicle (including vehicles for racing).

The tread 20 is a portion in contact with the road surface. On the tread 20, a pattern (unillustrated) corresponding to the use environment of the pneumatic tire 10 and the type of vehicle to be mounted is formed.

A circumferential groove 25 extending along the tire circumferential direction is formed in the tread 20. The circumferential groove 25 is a linear groove extending in parallel with the tire circumferential direction. In this embodiment, three circumferential grooves 25 are formed including on the tire equatorial line CL.

A widthwise groove (lug groove) extending to the tire width direction may be formed and may communicate with the circumferential groove 25.

The tire side portion 30 is continuous to the tread 20 and positioned inside the tire radial direction of the tread 20. The tire side portion 30 is an area from the outer edge of the tire width direction of the tread 20 to the upper edge of the bead portion 60. The tire side portion 30 is sometimes referred to as a sidewall.

The carcass 40 forms the skeleton of the pneumatic tire 10. The carcass 40 has a radial structure in which a carcass cord 41 (not shown in FIG. 1, see FIG. 2) arranged radially along the tire radial direction is covered with a rubber material. However, the carcass 40 is not limited to a radial structure, and may be a bias structure in which the carcass cords 41 are arranged so as to cross each other in the tire radial direction.

The crossing belt layer 50 is disposed inside the tire radial direction of the tread 20. The crossing belt layer 50 is provided between the carcass 40 and the spiral belt 100.

The crossing belt layer 50 is formed by a pair of crossing belts, specifically, a crossing belt 51 and a crossing belt 52. That is, the crossing belt layer 50 is disposed inside the tire radial direction of the spiral belt 100.

The crossing belt 51 is in contact with the carcass 40 and is disposed outside the tire radial direction of the carcass 40. The crossing belt 52 is in contact with the crossing belt 51 and is disposed outside the tire radial direction of the crossing belt 51.

The bead portion 60 is continuous to the tire side portion 30 and is positioned inside tire radial direction of tire side portion 30. The bead portion 60 is annular and the carcass 40 is folded from the inside of the tire width direction to the outside of the tire width direction via the bead portion 60.

The spiral belt 100 is disposed inside the tire radial direction of the tread 20. In this embodiment, the spiral belt 100 constitutes the reinforcing belt.

The spiral belt 100 is provided in an area of 80% or more of the overall width TW of the tread in the tire width direction. The spiral belt 100 may be provided in an area of 100% or more of the overall width TW, if possible.

The overall width TW is based on the condition that the pneumatic tire 10 is assembled to an appropriate rim wheel, the pneumatic tire 10 is set to a normal internal pressure, and the pneumatic tire 10 is loaded with a normal load.

The normal internal pressure is the air pressure corresponding to the maximum load capacity of the JATMA (Japan Automobile Tire Manufacturers Association) YearBook in Japan, and the normal load is the maximum load capacity (maximum load) corresponding to the maximum load capacity of the JATMA YearBook. In addition, ETRTO in Europe, TRA in the U.S., and other tire standards in each country correspond to it.

(2) INTERNAL STRUCTURE OF TIRE

Figure 2:
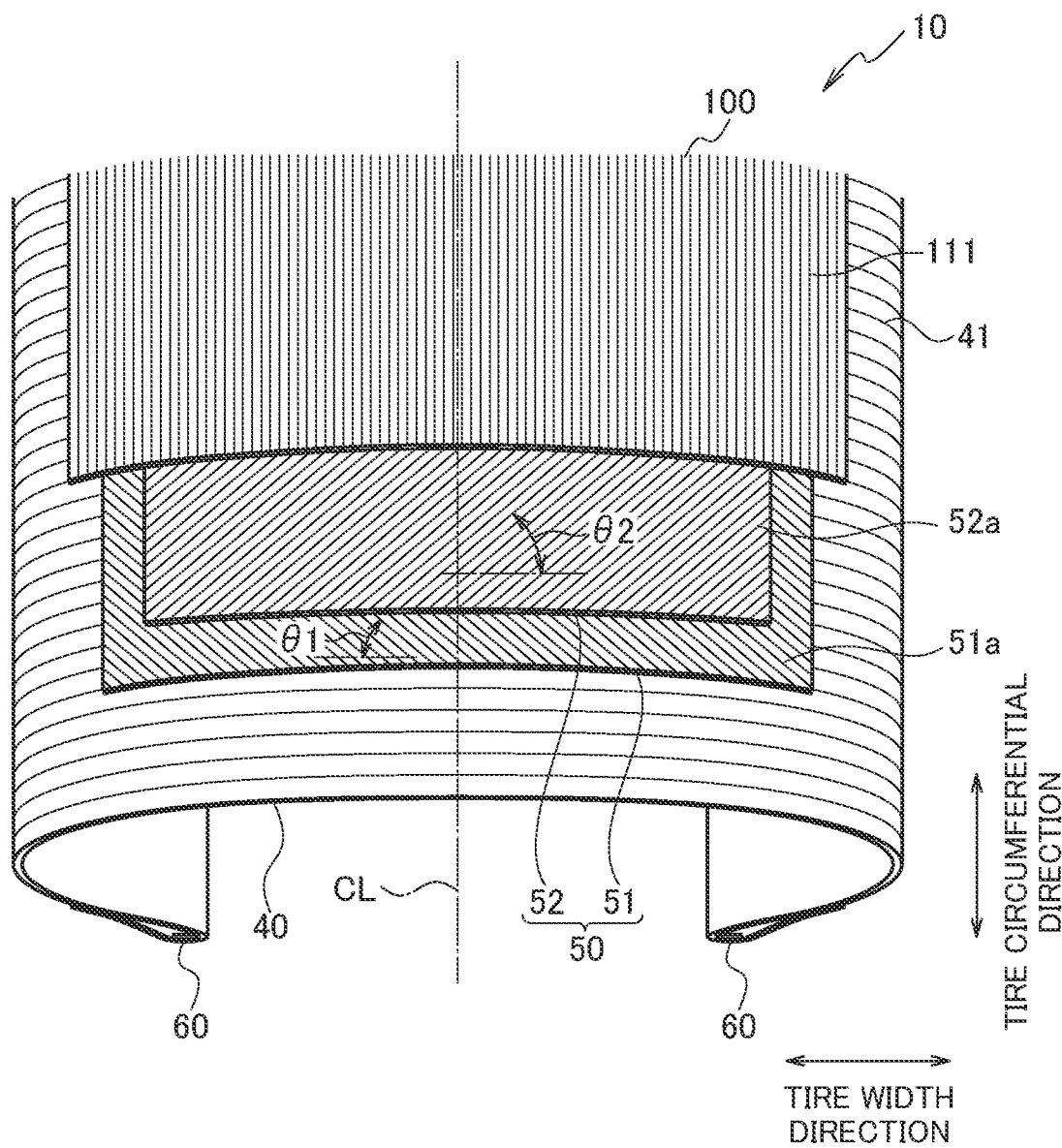
FIG. 2 is a top view (tread surface view) of a part of a carcass 40, a crossing belt layer 50 and a spiral belt 100 of the pneumatic tire 10.

Next, the internal structure of the pneumatic tire 10 will be further described. FIG. 2 is a top view (tread surface view) showing a part of the carcass 40, the crossing belt layer 50 and the spiral belt 100 of the pneumatic tire 10.

As shown in FIG. 2, the carcass 40 is of radial construction and has a carcass cord 41 disposed radially along the tire radial direction. The carcass cord 41 can be made of an organic fiber such as nylon, similar to the tire for general high-performance four-wheel vehicles.

The crossing belt 51 forming the crossing belt layer 50 is provided outside the carcass 40. The crossing belt 51 has a belt cord 51 a inclined with respect to the tire width direction.

The crossing belt 52 forming the crossing belt layer 50 is provided outside the crossing belt 51. The crossing belt 52 also has a belt cord 52 a inclined with respect to the tire width direction.

The belt cord 52 a is inclined in a direction opposite to the belt cord 51 a with the tire width direction as a reference (alternatively, the tire equatorial line CL may be used as a reference.).

In the present embodiment, the angle θ1 between the belt cord 51 a and the tire width direction is approximately 40 degrees. Although the belt cord 52 a is inclined in the direction opposite to the belt cord 51 a, the angle θ2 between the belt cord 52 a and the tire width direction is also approximately 40 degrees.

The belt cord 51 a and the belt cord 52 a are formed of organic fiber or steel. In the case of organic fibers, for example, polyester or Kevlar can be used.

The spiral belt 100 has a spiral cord 111 wound in tire circumferential direction. Specifically, the spiral belt 100 has the spiral cord 111 wound so as to be substantially parallel to the tire circumferential direction.

The angle formed by the spiral cord 111 with the tire circumferential direction (tire equatorial line CL) is preferably ±10 degrees or less, and more preferably ±5 degrees or less.

The spiral cord 111 is formed of organic fiber or steel. Although the material of the spiral cord 111 and the material of the belt cord 51 a and the belt cord 52 a may be the same, they are preferably different from each other in consideration of the performance required for the pneumatic tire 10. Specifically, the spiral cord 111 is preferably stronger than the belt cord 51 a and the belt cord 52 a. In the case of organic fibers, for example, Kevlar can be used.

In this embodiment, the tensile elongation at break of the spiral cord 111 is preferably 10 cN/dtex or more. The elongation at break of the spiral cord 111 is preferably 13% or less. The tensile elongation at break and the elongation at break are measured by the corresponding JIS measurement method.

Further, in the present embodiment, the arrangement interval (may be referred to as arrangement density) of the spiral cords 111 in the tire width direction is 10 cords/cm or more.

(3) STRUCTURE OF THE REINFORCING BELT

Figure 3:
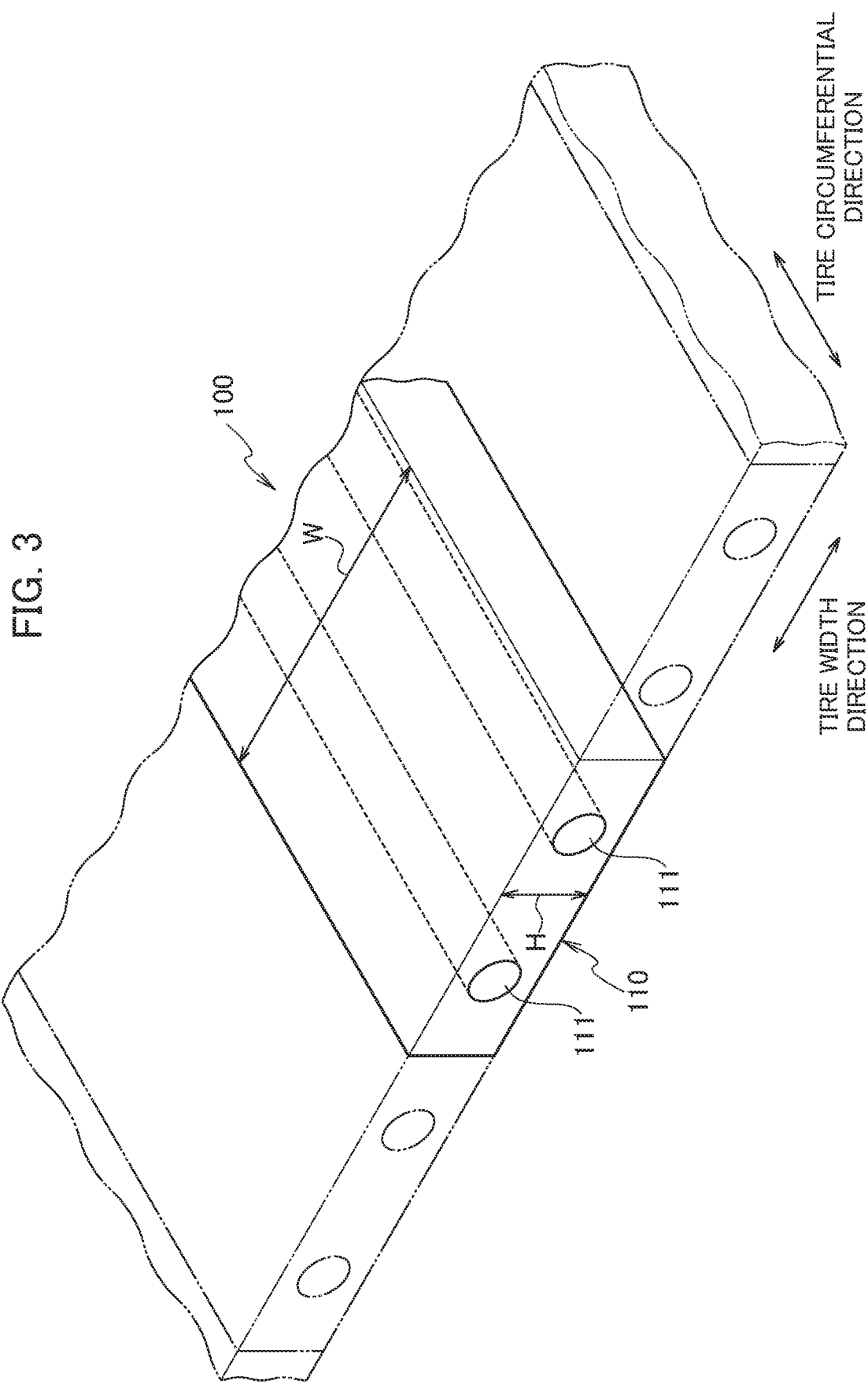
FIG. 3 is a perspective view of a part of the spiral belt 100.

Next, the structure of the spiral belt 100 will be further described. FIG. 3 is a perspective view of a part of the spiral belt 100.

As shown in FIG. 3, the spiral belt 100 comprises a plurality of cord units 110. Specifically, the spiral belt 100 is formed by winding the cord units 110, in which a plurality of spiral cords 111 are arranged along the tire width direction, around the tire circumferential direction.

In this embodiment, the cord unit 110 has two spiral cords 111 spaced in tire width direction. The cord unit 110 may be referred to as a two-strip winding (number of the spiral cords 111 included in the cord unit 110).

The size of the cord unit 110 in the tire width direction, specifically, the unit width W is preferably 4% or less of the overall width TW (see FIG. 1) of the tread 20. Although the lower limit of the unit width W is not particularly limited, it is considered that the unit width W is actually 0.3% or more of the overall width TW in consideration of the ease of manufacturing the cord unit 110.

The spiral belt 100 formed by the cord unit 110 may be called a mono-spiral belt (MSB). The spiral belt 100 is formed by winding the cord unit 110 having two spiral cords 111 a plurality of times in tire circumferential direction.

That is, the cord unit 110 is wound a plurality of times around the tire circumferential direction from one end toward the other end in the tire width direction.

The width of the cord unit 110 in the tire width direction, that is, the unit width W is narrower than the width GW (see FIG. 1) of the circumferential groove 25 in the tire width direction. The ratio of the width GW unit to the width W (GW/W) is preferably 2.5 to 20.0.

The spiral cord 111 is preferably twisted depending on a material (organic fiber or steel). The organic fiber (Kevlar) is preferably twisted at about 4 to 5 times/cm.

It is preferable that the number of the spiral cords 111 to be driven is 2 pieces/mm$^2$ or less for the cross sectional area of the cord unit 110, specifically, the product of the unit width W and the unit height H.

(4) FUNCTION AND EFFECTS

According to the embodiment described above, the following effects can be obtained. In the pneumatic tire 10, the spiral belt 100 has the spiral cord 111 wound in the tire circumferential direction. The tensile elongation at break of the spiral cord 111 is 10 cN/dtex or more. Further, the elongation at break of the spiral cord 111 is 13% or less.

The spiral belt 100 having the spiral cord 111 having high elasticity effectively suppresses pantograph deformation of the crossing belt layer 50. Furthermore, the spiral belt 100 effectively suppresses deformation of the crossing belt layer 50 in the tire circumferential direction, specifically deformation of a shoulder part of the tread 20 when lateral force is input to the pneumatic tire 10. That is, the shearing rigidity in the crossing belt layer 50 is improved.

Thus, at a low slip angle (SA), specifically, in a region where SA is 2 degrees or less, a larger cornering force (CF) than that of a conventional similar tire can be generated, and the cornering performance of a vehicle mounted with the pneumatic tire 10 is greatly improved. In particular, the cornering force of the rear tire to which the steering angle is not given can be effectively enhanced.

Further, since the tensile elongation at break of the spiral cord 111 is high and the elongation at break is low, particularly, the amount of distortion due to repetition of compression and tension of the spiral belt 100 at the time of high-speed rolling of the pneumatic tire 10 can be effectively suppressed.

Thus, failure caused by heat generation of rubber around the spiral belt 100 and the spiral belt 100 can be prevented.

Furthermore, the width (unit width W) of the cord unit 110 in the tire width direction is narrower than the width GW of the circumferential groove 25 in the tire width direction. Therefore, the cord unit 110 has high followability to the shape of the circumferential groove 25, and the gauge (rubber thickness) between the groove bottom part of the circumferential groove 25 and the cord unit 110 is easily made uniform after manufacturing. Thus, the rigidity distribution in the vicinity of the circumferential groove 25 is made uniform, and uneven wear in the vicinity of the circumferential groove 25 can be suppressed. Further, uniformity of gauge and rigidity distribution may also contribute to high speed durability.

The spiral belt 100 is formed by winding the cord units 110, in which a plurality of the spiral cords 111 are arranged along the tire width direction, around the tire circumferential direction. Therefore, since the cord units 110 can be wound along the tire circumferential direction, the spiral belt 100 can be easily manufactured (time reduction), and strength required for the spiral belt 100 can be easily secured.

That is, according to the pneumatic tire 10, the cornering force generated at a low slip angle can be further enhanced while improving high-speed durability.

In this embodiment, the spiral cord 111 is formed of an organic fiber such as Kevlar or steel. The arrangement interval of the spiral cords 111 in the tire width direction is 10 cords/cm or more. Further, the spiral belt 100 is provided in an area of 80% or more of the overall width TW of the tread 20 in the tire width direction.

Therefore, the improvement of the tensile elongation at break of the spiral cord 111 and the suppression of elongation at break can be made compatible in a high dimension. This can further enhance the high-speed durability of the pneumatic tire 10 and the cornering force at a low slip angle.

In this embodiment, the belt cord 51 a and the belt cord 52 a are made of organic fiber or steel. Thus, the pantograph deformation of the crossing belt layer 50 can be further suppressed. This can further enhance the high-speed durability of the pneumatic tire 10 and the cornering force at a low slip angle.

(5) OTHER EMBODIMENTS

Although the contents of the present invention have been described above with reference to the examples, it will be obvious to those skilled in the art that the present invention is not limited to these descriptions and that various modifications and improvements are possible.

For example, in the embodiment described above, the spiral cord 111 is wound so as to be substantially parallel to the tire circumferential direction, but the spiral cord 111 may be wound at a certain angle.

Specifically, the angle formed by the spiral cord 111 and the tire circumferential direction (tire equatorial line CL) may be ±10 degrees or less. That is, the angle between the spiral cord 111 and the tire width direction may be ±60 degrees or more.

For example, in the above-described embodiment, the cord unit 110 is a two-strip winding (two spiral cords 111), but as long as the unit width W<the width GW is satisfied, the number of the spiral cords 111 included in the cord unit 110 may be slightly increased.

Alternatively, the spiral belt 100 may be formed by winding one rubber-coated spiral cord 111 along the tire circumferential direction without using the cord unit 110.

The spiral belt 100 and the spiral cord 111 may also be referred to as a circumferential belt and a circumferential cord.

In the embodiment described above, the pneumatic tire 10 has been described as being a pneumatic tire for four-wheel vehicles such as passenger vehicles, and in particular, may be suitably used for high performance four-wheel vehicles (including vehicles for racing), whereas the pneumatic tire 10 may be used for general passenger vehicles, or may be widely used not only for four-wheel vehicles, but also for vehicles that use slip angles to corner.

While embodiments of the invention have been described as above, it should not be understood that the statements and drawings which form part of this disclosure are intended to limit the invention. Various alternative embodiments, examples and operating techniques will become apparent to those skilled in the art from this disclosure.

REFERENCE SIGNS LIST 10 pneumatic tire
20 tread
25 circumferential groove
30 tire side portion
40 carcass
41 carcass cord
50 crossing belt layer
51, 52 crossing belt
51 a, 52 a belt cord 60 bead portion
100 spiral belt
110 cord unit
111 spiral cord

The invention claimed is:

1. A tire comprising at least:
a tread in contact with a road surface; and
a reinforcing belt disposed inside in a tire radial direction of the tread, wherein
a circumferential groove extending along the tire circumferential direction is formed on the tread,
the reinforcing belt has a plurality of reinforcing cords wound around a tire circumferential direction,
the tensile elongation at break of each reinforcing cord is 10 cN/dtex or more,
each reinforcing cord has an elongation at break of 13% or less,
the reinforcing belt is formed by a plurality of two-strip winding cord units in which each cord unit includes exactly two reinforcing cords of the plurality of reinforcing cords that are arranged along the tire width direction and are wound around the tire circumferential direction,
the width of the cord unit in the tire width direction is narrower than the width of the circumferential groove in the tire width direction,
a ratio (GW/W) of a width GW of the circumferential groove to a unit width W of the cord unit is 2.5 or more to 20.0 or less, and
a number of the reinforcing cords driven is 2 pieces/mm$^2$ or less for a product of the unit width W and a unit height H of the cord unit, wherein
a crossing belt layer formed by a pair of crossing belts is disposed inside in the tire radial direction of the reinforcing belt,
the crossing belt layer has a belt cord inclined with respect to tire width direction,
the belt cord is formed of an organic fiber or steel,
the unit width W is 0.3% or more and 4% or less of the overall width TW of the tread, and
the reinforcing cord is formed of Kevlar and twisted 4 to 5 times/cm.

2. The tire according to claim 1, wherein the reinforcing belt is disposed in an area of 80% or more of the total width of the tread.

3. The tire according to claim 1, wherein an interval of the reinforcing cords in the tire width direction is 10 cords/cm or more.

4. The tire according to claim 1, wherein the reinforcing belt is disposed in an area of 80% or more of the total width of the tread.

5. The tire according to claim 1, wherein an interval of the reinforcing cords in the tire width direction is 10 cords/cm or more.

6. The tire according to claim 5, wherein the reinforcing belt is disposed in an area of 80% or more of the total width of the tread.

7. The tire according to claim 1, wherein, the belt cord is formed of a material different from the reinforcing cord.

8. The tire according to claim 7, wherein an interval of the reinforcing cords in the tire width direction is 10 cords/cm or more.

9. The tire according to claim 7, wherein the reinforcing belt is disposed in an area of 80% or more of the total width of the tread.

10. The tire according to claim 1, wherein the reinforcing cord is wound so as to be substantially parallel to the tire circumferential direction.

11. The tire according to claim 10, wherein an interval of the reinforcing cords in the tire width direction is 10 cords/cm or more.

12. The tire according to claim 10, wherein the reinforcing belt is disposed in an area of 80% or more of the total width of the tread.

13. The tire according to claim 1, wherein the reinforcing cord is formed of an organic fiber or steel.

14. The tire according to claim 13, wherein the reinforcing cord is wound so as to be substantially parallel to the tire circumferential direction.

15. The tire according to claim 13, wherein an interval of the reinforcing cords in the tire width direction is 10 cords/cm or more.

16. The tire according to claim 13, wherein the reinforcing belt is disposed in an area of 80% or more of the total width of the tread.

* * * * *